Feb. 4, 1930. A. KÉGRESSE 1,746,082

RUNNING TREAD

Filed April 13, 1928

Inventor;
A. Kégresse
Emil Bönnelycke
By Atty.

Patented Feb. 4, 1930

1,746,082

UNITED STATES PATENT OFFICE

ADOLPHE KÉGRESSE, OF SURESNES, FRANCE

RUNNING TREAD

Application filed April 13, 1928, Serial No. 269,781, and in France April 15, 1927.

It is well known that in order that a trailer may be capable of running at high speed, one essential is that it comply with certain conditions as to resiliency, the latter being obtained by means of the wheels and of the suspension thereof.

There are at present many types of trailers which do not meet such requirements and which, owing to that fact, are unserviceable for hooking up to high speed motor tractors. By far the greater part of the Army equipment at present in existence is in this plight, especially artillery.

The object of my invention is to provide a removable running tread adapted for rapid fitting on such trailers and calculated to enable them to be dragged along without any inconvenience at the travelling speed of modern motor tractors.

Figure 1:
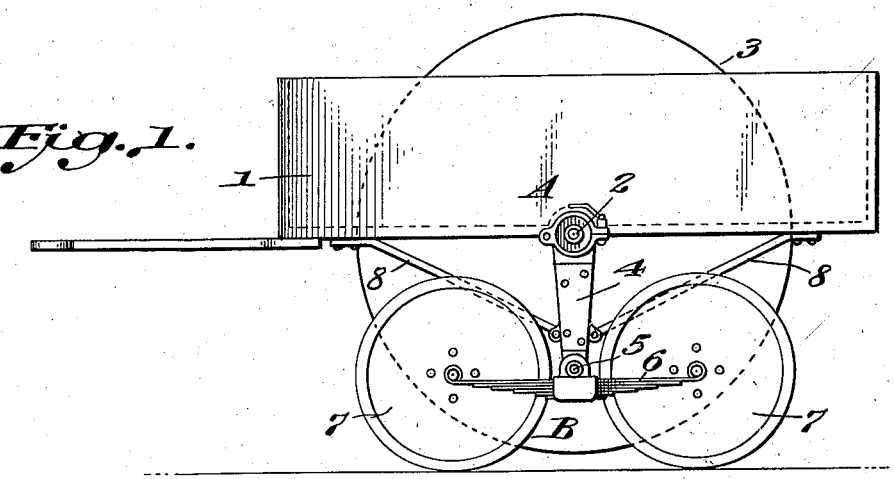
Figure 1 is a side elevation of a device according to my invention, the wheel of the trailer being removed.

In all the figures the trailer is represented by a rectangular body 1 resting directly upon an axle 2 the ends of which receive ordinary wheels 3.

As will be apparent said trailer has no suspension and, therefore, cannot be dragged along at high speed.

The improvements which are the subject of my invention and which will enable such a trailer to be dragged along at high speed comprise two similar devices, that is to say one for each of the wheels 3 of the trailer.

Each device comprises a strut 4 (Figures 2 and 3) mounted on the axle 1 by the side of the wheel 3. The lower part of said strut 4 carries an articulation 5 (Figures 1 and 3) serving as a pivot for two parallel springs 6 between the ends of which are mounted two wheels 7, which may be rubber-tired.

The whole is so arranged that, the device being in position, the wheels 3 of the trailer will be lifted a few centimeters above the ground.

Figure 2:
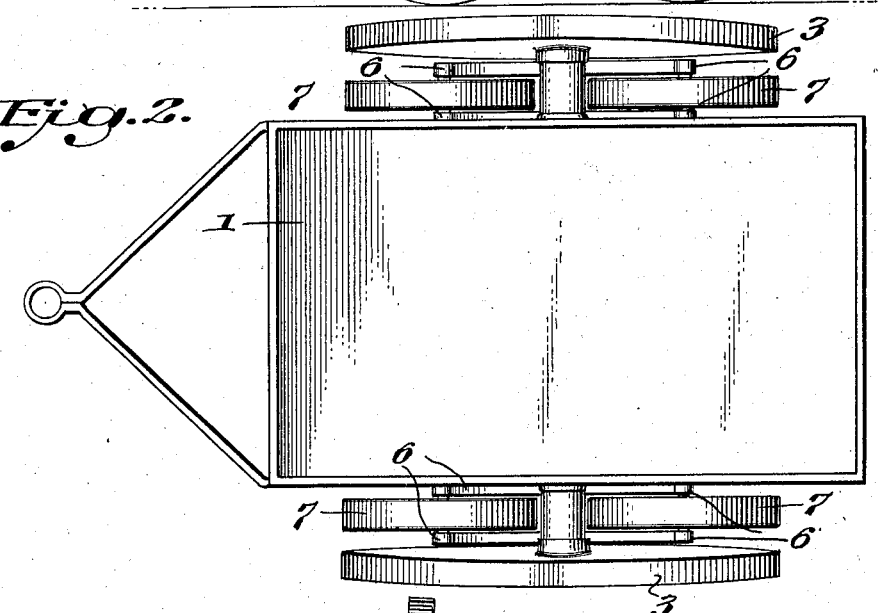
Figure 2 is a plan view thereof.
Figure 3:
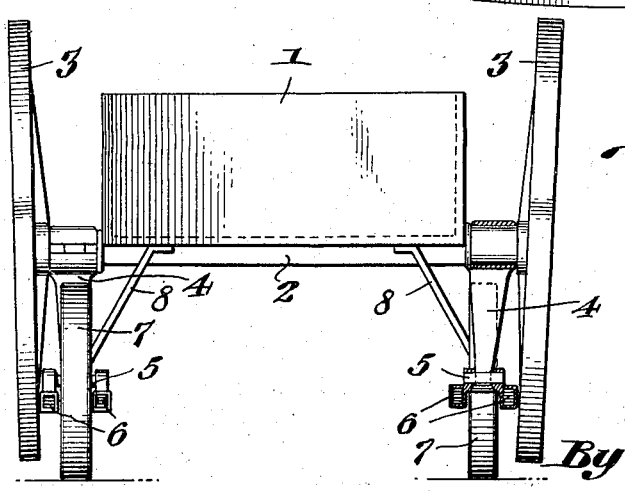
Figure 3 is an end view, with parts in section on line A—B of Figure 1.

Strut 4 is rigidly connected with the trailer and braced by any suitable means, such means being, in the example shown, two diagonal tierods 8 (Figure 1 and 3).

The operation of the above described construction will be realized at a glance: Wheels 7, on being lifted by ground unevennesses, will take action on springs 6, thereby transmitting damped shocks through struts 4 to the trailer. Articulation 5 will permit wheels 7 to move in the vertical plane independently of one another and reduce still more the force of the shocks received by said wheels and transmitted to the axle of the trailer through strut 4. The latter may be removably mounted either on the axle of the trailer, as in the example illustrated, or in any other manner without altering the character of my invention.

It will be noticed that the invention will improve the travel of the trailer over all kinds of ground.

On hard ground, wheels 7 and springs 6 will meet requirements as to resiliency and responsivity necessary for high speeds.

On soft ground, wheels 7 will sink a few centimeters until the trailer wheels 3 bear in their turn on the ground. There will thus be obtained a broad bearing surface that will limit sinking and consequently facilitate rolling along of the whole.

The foregoing description is diagrammatical like the drawing. Obviously many modifications of the device can be devised without departing from the scope of my invention.

I claim as my invention:

1. In combination with a non-suspended trailer comprising an axle, a body resting directly thereon, and wheels mounted on the axle ends: a running tread for the trailer comprising a pair of depending struts rigidly connected at their upper ends to the trailer at opposite sides thereof, a pair of parallel springs articulated at their centers to the lower end of each strut, the springs of each pair being arranged in spaced relation, and a pair of tread wheels at opposite sides of the trailer arranged one in front of the other in the space between the corresponding pair of springs and connected at their centers to the ends of the springs.

2. A trailer and running tread, according to claim 1, in which the trailer wheels are normally raised above the surface of the ground, while the tread wheels rest on the ground.

3. A trailer and running tread, according to claim 1, in which the tread wheels and springs are located between the trailer wheels and the adjacent sides of the trailer body.

4. A trailer and running tread, according to claim 1, in which the tread wheels and springs are located between the trailer wheels and the adjacent sides of the trailer body; and in which the trailer wheels are normally raised above the surface of the ground, while the tread wheels rest on the ground.

5. A non-suspended trailer, comprising a body, a pair of depending struts at opposite sides of the body and rigidly related thereto, a pair of parallel springs articulated at their centers to the lower end of each strut, the springs of each pair being arranged in spaced relation, and a pair of tread wheels at opposite sides of the trailer arranged one in front of the other in the space between the corresponding pair of springs and connected at their centers to the ends of the springs.

6. A non-suspended trailer, according to claim 5, in which each strut is braced by a pair of diagonal tie rods connected at their lower ends to the strut and at their upper ends to the trailer body.

In testimony, that I claim the foregoing as my invention, I have signed my name.

ADOLPHE KÉGRESSE.